March 3, 1970  F. L. BUCHTEL, JR  3,498,027
STREAM SPLITTER FOR GAS CHROMATOGRAPHY
Filed Sept. 11, 1967  2 Sheets-Sheet 1
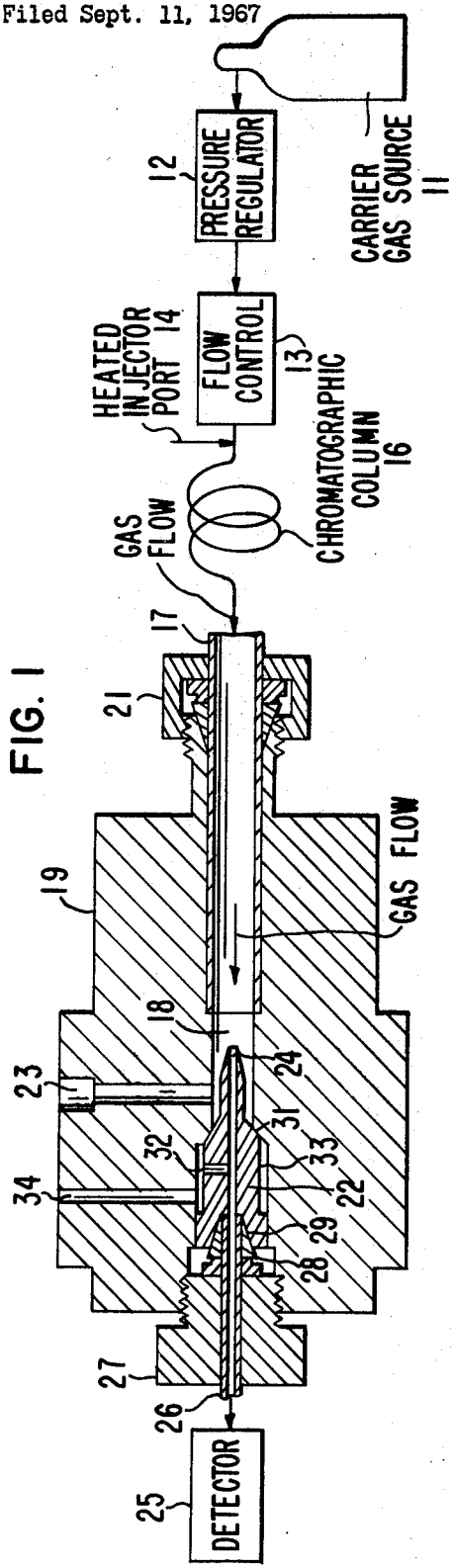
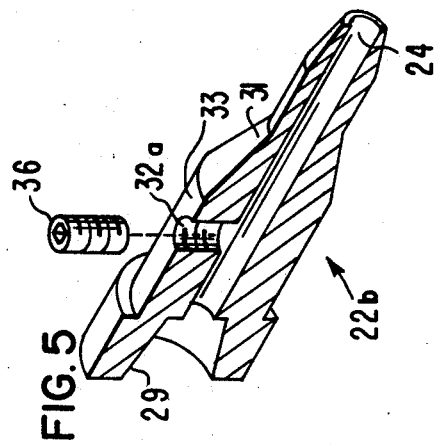
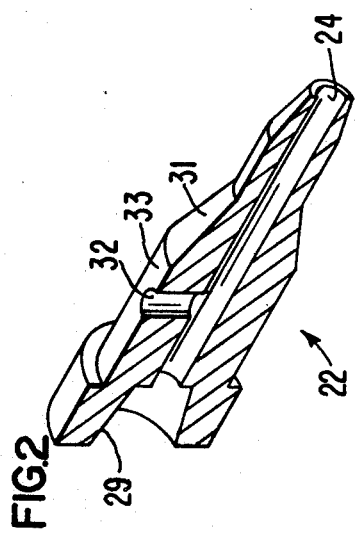
INVENTOR.
FORREST L. BUCHTEL JR.
BY
ATTORNEY March 3, 1970 F. L. BUCHTEL, JR 3,498,027
STREAM SPLITTER FOR GAS CHROMATOGRAPHY
Filed Sept. 11, 1967 2 Sheets-Sheet 2

INVENTOR.
FORREST L. BUCHTEL JR.
BY
ATTORNEY

United States Patent Office 3,498,027
Patented Mar. 3, 1970

3,498,027
STREAM SPLITTER FOR GAS
CHROMATOGRAPHY
Forrest L. Buchtel, Jr., Orinda, Calif., assignor to Varian Associates, Palo Alto, Calif., a corporation of California
Filed Sept. 11, 1967, Ser. No. 666,618
Int. Cl. B01d 15/08
U.S. Cl. 55—197                9 Claims

ABSTRACT OF THE DISCLOSURE

A stream splitter for either the input or output stream of a chromatographic column. A splitter insert having an axial bore is positioned opposite the gas stream so as to divide the stream into two unequal flows, with the smaller flow going through the axial bore. When the insert is used as an input splitter, the axial flow becomes the input stream to a capillary column. When used as an output splitter, the axial flow goes to a flame ionization detector or other detector requiring small gas flow. A radial bore in the insert allows hydrogen to be mixed with the axial flow when the insert is used as an output splitter.

---

Figure 3:
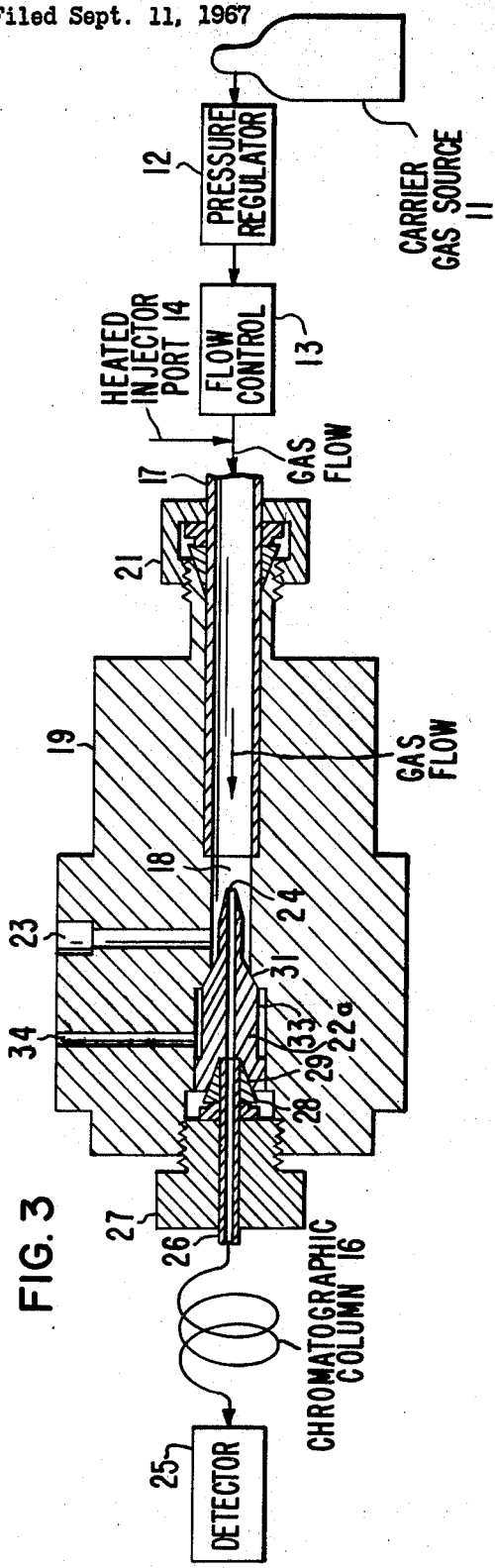

This invention relates to stream splitters for use in gas chromatography. In particular, the invention relates to a stream splitter having a replaceable insert which permits the operator to select a reproducible stream split ratio.

Stream splitters used in gas chromatography are of two types; input splitters and output splitters. An input splitter is required for use with capillary columns because of the small sample capacity of such columns. The injected sample is first vaporized and mixed with carrier gas in a suitable injector. The mixed gas stream then flows through an input splitter where it is divided into two unequal flows, with the smaller flow becoming the input to the capillary column and the larger flow venting to atmosphere. In this way only a small fraction of the injected sample volume enters the column and its sample capacity is not exceeded. An output splitter works in much the same manner, except that it is positioned in the column output stream. Certain detectors, notably the flame ionization detector, require a certain optimum flow rate for proper operation. An output splitter divides the column output stream into two split streams, with one of the two split streams going to the detector. Thus, regardless of the column flow rate, the detector is provided with the proper gas flow rate for best operation.

One of the important requirements of a stream splitter is that it have a reproducible "split ratio," i.e., the ratio of the larger to the smaller flow rate. One common splitter design uses a needle valve in one flow leg so that the operator can vary the split ratio as desired. Although this design provides for continuous variability of the split ratio, the reproducibility is poor since it is difficult to exactly reproduce the original position of the valve stem once it has been changed. Another splitter design uses a fine wire inserted in one flow leg which acts as a flow restrictor. The split ratio is varied by selecting wires of different diameters. This design has good reproducibility of the split ratio, however the wires are easily bent in use and must be replaced fairly often.

The present invention provides a stream splitter having excellent split ratio reproducibility. The splitter comprises a removable insert, having an axial bore, positioned within a block which has appropriate flow passages to accommodate the various gas flows. The axial bore of the insert is centrally positioned opposite the gas stream entering the block. The gas stream is divided into two flows whose ratio (the split ratio) is a function of the cross-sectional areas of the entrance flow passage in the block and the axial bore in the insert. The operator selects a desired split ratio simply by choosing an insert having the appropriate bore diameter. Split ratio reproducibility is excellent since the ratio is determined by the fixed dimension of the insert bore. The splitter is also mechanically rugged as it does not incorporate fine wires, metering valves, or other delicate parts.

Figure 4:
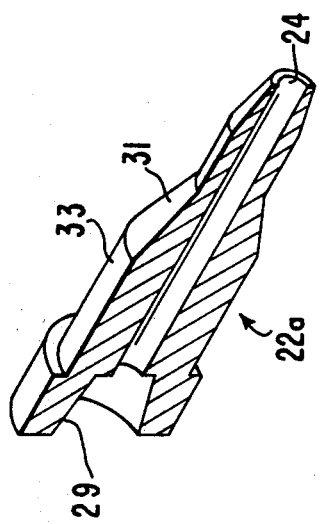

The invention will be described with reference to the accompanying drawings, in which;

FIG. 1 is a combined cross sectional and schematic view of the splitter adapted for use as an output splitter in a gas chromatographic system, FIG. 2 is an enlarged sectional illustration of the splitter insert shown in FIG. 1, FIG. 3 is a combined cross sectional and schematic view of the splitter adapted for use as an input splitter in a gas chromatographic system, FIG. 4 is an enlarged sectional illustration of the splitter insert shown in FIG. 3, and FIG. 5 is an enlarged sectional illustration of a convertible splitter insert which may be used in either input or output splitter configurations.

Referring to FIG. 1, there is shown a splitter according to the invention arranged to operate as an output splitter. The splitter itself is shown in cross section, whereas the associated chromatographic system is shown schematically. A regulated flow of carrier gas is provided by a gas source 11, a pressure regulator 12, and a flow controller 13. The sample mixture to be separated is introduced as a vapor into the stream of carrier gas by means of a heated injector port 14, and the mixed stream of vaporized sample and carrier gas enters the input end of a chromatographic column 16 wherein the individual components in the sample mixture are separated from each other. The exit end of column 16 is extended to form a splitter input conduit 17 which is coaxially positioned within an axial bore 18 formed in a splitter block 19, the connection being made leaktight by a threaded fitting 21 of the conventional swaged ferrule type. The effluent stream from column 16 flows through conduit 17 and impinges on a splitter insert 22 coaxially positioned within bore 18. One portion of the gas stream is diverted around the head of insert 22 and is vented to atmosphere through a radial bore 23 formed in splitter block 19. If it is desired to collect this portion of the stream, bore 23 may be connected to an external trapping chamber (not shown). The other portion of the gas stream flows straight through an axial bore 24 in insert 22 and leaves the splitter block via an output conduit 26 leading to a chromatographic detector 25. A leaktight threaded fitting 27 positions conduit 26 in collinear relation with bores 18 and 24 such that a straight through flow path is provided for the undiverted portion of the gas stream. In addition, the inner end of fitting 27 bears against a conical ferrule 28 swaged onto the end of conduit 26, thereby forcing ferrule 28 into sealing contact with a corresponding conical mating surface 29 formed in the "downstream" end of insert 22. The axial thrust of ferrule 28 not only positions insert 22 in precise relation to splitter block 19, but also forces a conical sealing surface 31 on insert 22 into gastight sealing contact with a corresponding conical sealing surface in block 19.

The output splitter shown in FIG. 1 is an embodiment specifically adapted for use with a flame ionization detector, although the invention may be used with other conventional detectors. For this purpose, insert 22 is provided with a radial bore 32 which communicates with axial bore 24. An annular cutout portion 33 on the surface of insert 22 provides a flow path between bore 32 and a radial bore 34 in splitter block 19. Hydrogen gas (required by the flame ionization detector as a source of ionizing energy) is introduced into bore 34 from an external hydrogen supply (not shown). The hydrogen flows into the annular space between surface 33 and block 19, thence through radial bore 32, and finally mixes with the gas stream flowing axially through bore 24. The gas stream entering detector 25 thus consists of a mixture of carrier gas, separated sample components, and hydrogen. In this manner, the splitter premixes hydrogen with the carrier gas, thereby eliminating the need for supplying hydrogen to detector 25 through a separate supply conduit. Another feature of the splitter design is that an unimpeded flow path exists between bores 34, 32, and 24 regardless of the rotational position of insert 22. This is because the annular space surrounding surface 33 is always in communication with bores 32 and 34 irrespective of the angular position of bore 32 relative to the central axis of splitter block 19. Thus, when changing or replacing inserts, the operator need not be concerned with the rotational alignment of bores 34 and 32. The relation of the various bores and sealing surfaces is shown more clearly in FIG. 2 which is an enlarged view of insert 22.

FIG. 3 shows a splitter according to the invention arranged to operate as an input splitter. As mentioned previously, the purpose of an input splitter is to allow only a small fraction of the injected sample volume to enter the chromatographic column. Accordingly, FIG. 3 shows the splitter connected between the injector port and the column, rather than between the column and the detector as in FIG. 1. The operation of the splitter is similar to that already described, with the major portion of the gas stream venting to atmosphere through bore 23, and the smaller portion of the stream flowing straight through axial bore 24. The major operating difference in the input splitter is that hydrogen is not premixed with the carrier gas. This is because the input splitter is positioned at the entrance to the column, and premixing hydrogen with a heavier carrier gas (such as nitrogen or argon) might decrease the separating ability of the column (see "Gas Chromatography," A. B. Littlewood, p. 185, Academic Press, 1962). Therefore, in FIG. 3, insert 22 has been replaced with a modified insert 22a in which bore 32 is absent. An enlarged view of insert 22a is shown in FIG. 4.

FIG. 5 shows a convertible insert 22b which may be used with either an input or output splitter. An internally threaded radial bore 32a is adapted to receive a tight fitting set screw 36. Thus, when insert 22b is used in an input splitter, screw 36 is threaded into bore 32a, thereby closing off the bore and making it gastight. Correspondingly, when insert 22b is used in an output splitter, screw 36 is removed from bore 32a, thus opening the bore and allowing hydrogen to be premixed with the carrier gas flowing through axial bore 24. However, if the splitter were to be used in the output splitter configuration with a detector that does not require mixing of hydrogen with the carrier gas, e.g., an electron capture detector, bore 32a would be closed off with screw 36.

As mentioned previously, the split ratio is a function of the cross sectional areas of the input flow passage in the splitter block and the axial bore in the splitter insert Referring specifically to FIG. 1, the split ratio is given by the following relation:

(1) $$\text{Split ratio} = \frac{F_{23}}{F_{26}} = \frac{(A_{18} - A_{24})}{A_{24}}$$

where:

$F_{23}$ = flow rate through bore 23
$F_{26}$ = flow rate through conduit 26
$A_{18}$ = cross sectional area of bore 18
$A_{24}$ = cross sectional area of bore 24.

In practice, $A_{18}$ is kept constant and the user selects a splitter insert having a value of $A_{24}$ such that the desired split ratio will be obtained in accordance with Equation 1. For example, if the desired split ratio is 5, and $A_{18}$ is 12.55 square millimeters (corresponding to a bore 18 diameter of 4 millimeters), solving Equation 1 for $A_{24}$ gives 2.09 square millimeters (corresponding to a bore 24 diameter of 1.63 millimeters). It will be apparent that a graduated set of inserts can be provided, each marked with a different value of split ratio, and all the user need do is select the insert marked with the desired split ratio.

Although the invention has been described with particular reference to a preferred embodiment for use in gas chromatography, the same apparatus can be used in a liquid chromatography system and, indeed, in any flow system wherein it is desired to divide a flow stream into two streams whose flow rate ratio can be precisely and reproducibly determined. In addition, the description of the splitter in conjunction with a flame ionization detector is for illustrative purposes only, and the splitter may be employed with any of the conventional detectors used in chromatography.

What is claimed is:
1. A chromatographic system comprising,
 (a) a source of carrier fluid,
 (b) means defining a flow path for said carrier fluid so as to create a carrier fluid stream,
 (c) means for introducing a sample mixture into said carrier fluid stream,
 (d) a chromatographic column having an input end and an output end, the input end of said column communicating with said carrier fluid stream at a point downstream of the sample introduction point,
 (e) a stream splitter connected to the output end of said chromatographic column, said stream splitter comprising,
  (1) a splitter block having a axial flow passage passing therethrough and a radial flow passage communicating at one of its ends with said axial flow passage and at its other end with the external surface of said splitter block, one end of said axial flow passage communicating with the output end of said chromatographic column,
  (2) a splitter insert, having an axial bore passing therethrough, removably positioned within said splitter block such that the axial bore in said insert is coaxial with the axial flow passage in said splitter block, said splitter insert being dimensioned to define together with said axial flow passage a peripheral recess coaxial with said axial flow passage and communicating with said radial flow passage in said block, and
  (3) means for removably positioning said splitter block in sealing engagement therewith such that said carrier fluid stream is split into first and second split streams, said first split stream flowing through said peripheral recess and through the axial bore in said insert, and said second split stream flowing through the radial flow passage in said splitter block, and
 (f) a chromatographic detector disposed in the flow path of said first split stream.
2. A chromatographic system comprising,
 (a) a source of carrier fluid,
 (b) means defining a flow path for said carrier fluid so as to create a carrier fluid stream,
 (c) means for introducing a sample mixture into said carrier fluid stream,
 (d) a stream splitter having a single flow input and first and second flow outputs, with the flow input disposed in flow communication with said carrier fluid stream at a point downstream of the sample introduction point, said stream splitter comprising,
  (1) a splitter block having an axial flow passage passing therethrough and a radial flow passage communicating at one of its ends with said axial flow passage and at its other end with the external surface of said splitter block, one end of said axial flow passage constituting the flow input of the stream splitter and the other end constituting said first flow output of said stream splitter, (2) a splitter insert, having an axial bore passing therethrough, removably positioned within said splitter block such that the axial bore in said insert is coaxial with the axial flow passage in said splitter block, and (3) means for removably positioning said splitter insert within said splitter block in sealing engagement therewith such that said carrier fluid stream is split into first and second split streams, said first split stream flowing through the axial bore in said insert, and said second split stream flowing through the radial flow passage in said splitter block, (e) a chromatographic column having an input end and an output end, the input end of said column being disposed in flow communication with said first flow output of said stream splitter, and (f) a chromatographic detector disposed in flow communication with the output end of said chromatographic column.

3. A stream splitter, comprising in combination,
(a) a splitter block having an axial flow passage passing therethrough and a radial flow passage communicating at one of its ends with said axial flow passage and at its other end with the external surface of said splitter block,
(b) a splitter insert, having an axial bore passing therethrough, removably positioned within said splitter block such that the axial bore in said insert is coaxial with the axial flow passage in said splitter block, and
(c) means for removably positioning said splitter insert within said splitter block including sealing means comprising a first conical surface formed in a portion of said axial flow passage and a mating conical surface on said insert such that a fluid stream entering one end of the axial flow passage in the splitter block is split into first and second split streams, said first split stream flowing through the axial bore in said insert, and said second split stream flowing through the radial flow passage in said splitter block.

4. The stream splitter according to claim 3, wherein said splitter block has a second radial flow passage therein, said splitter insert is dimensioned to provide a peripheral recess between said insert and said block, said recess communicating with said second radial flow passage, and said splitter insert has a radial bore therein which interconnects said recess and said axial bore in said splitter insert.

5. The stream splitter according to claim 4, wherein the radial bore in said splitter insert is internally threaded and further including a removable tight set screws in said bore so that the radial bore is sealed and can be opened by removal of said set screw.

6. A stream splitter, comprising in combination:
a splitter block having an axial flow passage therethrough and a radial flow passage communicating at one of its ends with said axial flow passage and at its other end with the external surface of said splitter block, a first conical sealing surface in said axial flow passage;
a splitter insert removably positioned within said splitter block comprising, an elongated generally cylindrical member having an axial bore therethrough coaxial with said axial flow passage;
a second conical sealing surface on said member intermediate the ends thereof and coaxial therewith, said first and second conical surfaces being dimensioned to mate together, and a third sealing surface on said member remote from said conical sealing surfaces.

7. A stream splitter as described in claim 6 wherein the exterior surface of said generally cylindrical member comprises;
(a) a conical transition from a first diameter at one end of the member to a first cylindrical segment having a second diameter,
(b) a second conical transition from said first cylindrical segment to a second cylindrical segment having a third diameter, said second conical transition comprising said second conical sealing surface and
(c) an annular flange having a fourth diameter extending from said second cylindrical segment to the other end of said member, said annular flange comprising said third sealing surface.

8. A stream splitter as set forth in claim 7 wherein said member has a conical bore extending axially into said other end and in communication with said axial bore, and a radial bore through said member for providing a radial flow passage in communication with said axial flow passage.

9. An insert as set forth in claim 8 wherein said radial bore is located intermediate said second conical transition and said other end, and means are provided in said radial bore for selectively eliminating flow through said radial flow passage.

References Cited

UNITED STATES PATENTS 3,103,942    9/1963    Sharp    137—561 X
3,128,619    4/1964    Lieberman    73—23.1

JAMES L. DECESARE, Primary Examiner

U.S. Cl. X.R.

137—561